United States Patent
Deshwal et al.

(10) Patent No.: US 9,959,661 B2
(45) Date of Patent: May 1, 2018

(54) METHOD AND DEVICE FOR PROCESSING GRAPHICS DATA IN GRAPHICS PROCESSING UNIT

(71) Applicant: Samsung Electronics Co., Ltd., Suwon-si (KR)

(72) Inventors: Ankur Deshwal, Uttar Pradesh (IN); Somya Singhal, Bangalore (IN); Keshavan Varadarajan, Bangalore (IN); Soma Kohli, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 15/367,507

(22) Filed: Dec. 2, 2016

(65) Prior Publication Data

US 2017/0161942 A1    Jun. 8, 2017

(30) Foreign Application Priority Data

Dec. 2, 2015  (IN) ............................ 6478/CHE/2015
Oct. 5, 2016  (KR) ........................ 10-2016-0128568

(51) Int. Cl.
- *G06T 15/50* (2011.01)
- *G06T 15/00* (2011.01)
- *G06T 11/40* (2006.01)

(52) U.S. Cl.
CPC ............ *G06T 15/005* (2013.01); *G06T 11/40* (2013.01)

(58) Field of Classification Search
None
See application file for complete search history.

(56) References Cited

U.S. PATENT DOCUMENTS

| | | |
|---|---|---|
| 5,740,463 A | 4/1998 | Oshima et al. |
| 8,027,514 B2 | 9/2011 | Takaki et al. |
| 8,203,564 B2 | 6/2012 | Jiao et al. |
| 8,731,046 B2 | 5/2014 | Schmit et al. |
| 8,854,383 B2 | 10/2014 | Tsai et al. |
| 8,942,481 B2 | 1/2015 | Suarez Cambre et al. |
| 2009/0052780 A1 | 2/2009 | Kwon et al. |

(Continued)

FOREIGN PATENT DOCUMENTS

KR    100472203    2/2005

OTHER PUBLICATIONS

Guohui Wang, et al., "Workload Analysis and Efficient OpenCL-based Implementation of SIFT Algorithm on a Smartphone", IEEE Global Conference on Signal and Information Processing (GlobalSIP), Dec. 2013, Austin, Texas, USA.

(Continued)

*Primary Examiner* — Peter Hoang (74) *Attorney, Agent, or Firm* — F. Chau & Associates, LLC (57) ABSTRACT

Provide are a methods and devices for processing graphics data in a graphics processing unit (GPU). The method of processing graphics data includes receiving, at a processor, a difference of Gaussian (DOG) layer of an image, detecting, from the received DOG layer, a candidate DOG layer of the image as an intermediate layer, detecting at least one extreme point by comparing values of the candidate DOG layer with values of a previous DOG layer and a next DOG layer, and storing the at least one extreme point in a buffer.

16 Claims, 8 Drawing Sheets

(56) References Cited

U.S. PATENT DOCUMENTS

| | | | |
|---|---|---|---|
| 2011/0161443 A1* | 6/2011 | Fahn | G06F 17/30277 |
| | | | 709/206 |
| 2012/0106847 A1 | 5/2012 | Qi | |
| 2013/0343655 A1 | 12/2013 | Tai et al. | |
| 2014/0086557 A1 | 3/2014 | Yu et al. | |
| 2014/0105475 A1 | 4/2014 | Sato et al. | |
| 2016/0148359 A1* | 5/2016 | Gnedin | G06T 5/20 |
| | | | 382/264 |

OTHER PUBLICATIONS

S. Heymann, et al., "SIFT Implementation and Optimization for General-Purpose GPU", Science Press, Plzen, Czech Republic.
Seth Warn, et al., "Accelerating SIFT on Parallel Architectures", IEEE 2009.
Sudipta N. Sinha, et al., "GPU-based Video Feature Tracking and Matching", Technical Report TR 06-012 (May 2006), Department of Computer Science, UNC Chapel Hill.

* cited by examiner

FIG. 8

METHOD AND DEVICE FOR PROCESSING GRAPHICS DATA IN GRAPHICS PROCESSING UNIT

CROSS-REFERENCE TO RELATED APPLICATIONS

This application claims the benefit under 35 USC § 119(a) of Indian Patent Application No. 6478/CHE/2015, filed on Dec. 2, 2015, in the Indian Intellectual Property Office, and Korean Patent Application No. 10-2016-0128568, filed on Oct. 5, 2016, in the Korean Intellectual Property Office, the entire disclosures of which are incorporated herein by reference for all purposes.

BACKGROUND

1. Field

The following description relates to methods and devices for detecting extrema in a tile-based graphics processing unit (GPU).

2. Description of Related Art

In an example, a feature is detected by identifying a local feature or a point of interest in an image that may be used for computer vision applications, such as, for example, an application for object detection, an application for object recognition, and an application for face detection. The method of detecting a feature provides various approaches for computerized object recognition, object detection, image matching, and three-dimensional (3D) reconstruction. Various computations are performed by a graphics processing unit (GPU) to identify the local feature or the point of interest in the image.

An point of interest in an image may be defined based on a function of the image, such as a series of filtering operations performed after detection of extrema. The extrema is one of important characteristics of an object, and in an example, the extrema is defined as the leftmost, rightmost, uppermost, and lowermost points of the object with respect to a reference frame of an image. Based on such data of extreme points, a bounding box having a rectangular shape that encompasses the object is defined. The bounding box is used to confine a region of the image, which is to be analyzed in order to identify detailed characteristics of the object.

Scale invariant feature transform (SIFT) is a method utilized to detect and extract local feature descriptors that may be invariant to changes in, for example, illumination, image noise, rotation, scaling, and viewpoints. The SIFT may be applied to computer vision problems, such as, for example, object recognition, face recognition, object detection, image matching, 3D structure construction, stereo correspondence, and motion tracking. SIFT may be a time-consuming operation, and there may be some cases (e.g. online object recognition) in which SIFT features are required to be extracted and matched in real-time. Extraction of the SIFT features is implemented or accelerated in the GPU. However, SIFT is a serial operation and is designed to be performed by a single processor system. Parallelization of SIFT may cause load imbalance and deteriorate scaling efficiency.

Conventional systems use various methods of detecting a feature. However, these conventional methods require high power and computation resources. As GPUs have limited memory and computing capacity, and have energy sensitivity, a method of detecting a feature with energy efficiency is needed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter In one general aspect, there is provided a method of processing graphics data, the method including receiving, at a processor, a difference of Gaussian (DOG) layer of an image, detecting, from the received DOG layer, a candidate DOG layer of the image as an intermediate layer, detecting at least one extreme point by comparing values of the candidate DOG layer with values of a previous DOG layer and a next DOG layer, and storing the at least one extreme point in a buffer.

The method may include performing key point localization at a shader core of the processor using the stored at least one extreme point.

The detecting of the at least one extreme point may include comparing the values of the candidate DOG layer with the corresponding values of the previous DOG layer to detect extreme points, and comparing the extreme points of the candidate DOG layer and the previous DOG layer with the corresponding values of the next DOG layer to detect the at least one extreme point.

The DOG layer may be stored in the buffer.

The DOG layer may be computed via a shader core of the processor based on tiles of the image.

The at least one extreme point may include any one or any combination of a maximum value and a minimum value.

In another general aspect, there is provided a device for processing data of extreme points, the device including a graphics processing unit (GPU) configured to receive a candidate difference of Gaussian (DOG) layer of an image, detect the candidate DOG layer of the image as an intermediate layer, and detect at least one extreme point by comparing values of the candidate DOG layer with values of a previous DOG layer and a next DOG layer, and a buffer configured to store the at least one extreme point.

The may include a shader core configured to receive the stored at least one extreme point, and to detect key point localization of the received at least one extreme point.

The GPU may be configured to compare the values of the candidate DOG layer with the corresponding values of the previous DOG layer to detect extreme points, and compare the extreme points of the candidate DOG layer and the previous DOG layer with the corresponding values of the next DOG layer to detect the at least one extreme point.

The DOG layer may be stored in the buffer.

The device may include a shader core configured to compute the DOG layer based on tiles of the image.

The at least one extreme point may include any one or any combination of a maximum value and a minimum value.

In another general aspect, there is provided a graphics processing unit (GPU) to detect at least one extreme point in an image, the GPU including a shader core configured to determine a difference of Gaussian (DOG) layer of an image, a comparator configured to identify the DOG layer as an intermediate layer, and to detect the at least one extreme point by comparing values of the DOG layer with values of a previous DOG layer and a next DOG layer, and a buffer configured to store values of the DOG layer, the previous layer, the next layer and the extreme point.

The comparator may be configured to obtain values of the DOG layer from the buffer, compare the values of the DOG layer with the values of the previous layer, stored in the buffer, to detect first extreme points, compare the first extreme points with the values of the next layer, stored in the buffer, to detect the at least one extreme point.

The shader core may be configured to receive the detected at least one extreme point, to perform key point localization on the received at least one extreme point.

Other features and aspects will be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or apparatuses described herein. However, various changes, modifications, and equivalents of the methods, apparatuses, and/or apparatuses described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

In an example, a graphics processing unit (GPU) detects a key point by generating a difference of Gaussian (DOG) pyramid and detecting extrema.

In an example, DOG denotes a band-pass filtering operator obtained by calculating a difference, point-by-point, of two low-pass filtered (blurred) versions of the same grayscale image. Each of the two low-pass filtered (blurred) versions may be obtained by convolving an image with two bi-dimensional Gaussian filters having different radii. For example, the relationship of the following Equation 1 may be established.

$$DOG(x,y,\sigma) = L(x,y,k\sigma) - L(x,y,\sigma) = G(x,y,k\sigma) * I(x,y) - G(x,y,\sigma) * I(x,y),$$ [Equation 1]

where $G(x, y, \sigma) = e^{\{-(x^2+y^2)/2\sigma^2\}}/2\pi\sigma^2$, $I(x, y)$ is an input image, $k \in R$, and "*" is a convolution operator.

The DOG filter, with its typical Mexican hat transfer curve is an approximation of the scale-normalized Laplacian of Gaussian (LOG), and may be employed for edge detection. The DOG operator is the initial step of several image detection algorithms, and is generally preferred to LOG for its more effective implementation allowed by the separability of Gaussian filters.

In an example, the DOG image is obtained for each pair of images $L(x, y, \sigma\ i+1)$ and $L(x, y, \sigma\ i)$. A plurality of candidates for a key point is detected from the DOG images corresponding to different scales of input images.

Digital images correspond to discrete domains, and thus, a two-dimensional (2D) Gaussian filter may be expressed as the combination of two one-dimensional (1D) convolutions. Hence, the discrete scale-space may be calculated for every pixel in (i, j), by executing the convolution with a 1D Gaussian kernel and then convolving the result with the complementary kernel of the equivalent 2D filter. As such, the computation may be separated so that the computational complexity may be reduced from $O(n^2)$ to $O(2n)$.

Figure 1:
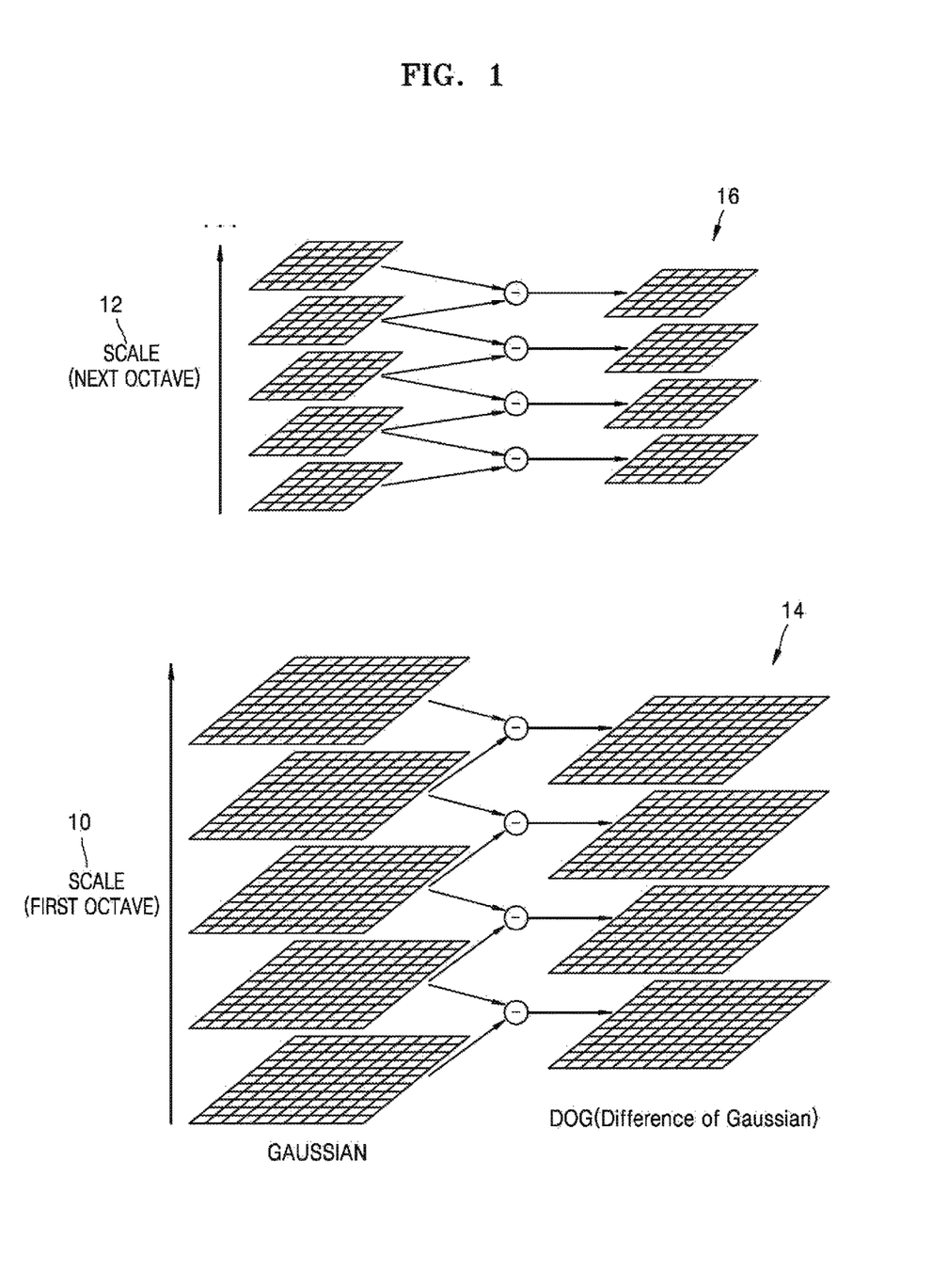
FIG. 1 is a diagram illustrating an example of a Gaussian image in a scale-space pyramid.

Referring to FIG. 1, in an example, the process of forming a scale-space pyramid is as follows. First, the input images is blurred with Gaussian filters having increasing $\sigma$ values (that is, scales increase). Second, as shown Equation 1, DOGs may be calculated from the blurred image with adjacent $\sigma$. Third, procedures 1 and 2 is repeated with respect to 2× down sampled (namely, octaves) versions of the input image.

In an example, the parameter k is set to be equal to $2^{1/S}$, where S+3 represents the number of scales for each octave. In an example, to preserve hardware (HW) accuracy comparable with the software implementations and limiting the sizes of the proposed processor, a value of S=2 is selected, which results in five scales for each octave, and other octaves 12 including down sampled images two, four, and eight times smaller than the original image used in the first octave 10. From the perspective of extension of the proposed design, the scalability of the proposed design easily allows for a different dimensioning of the scale-space pyramid in order, for example, to reduce the processor size as well as improve power/speed performance Although Gaussian filters have infinite domains, in an example, a reasonable approximation is obtained when their unilateral dimensions are limited to $6\sigma+1$, with $\sigma$ being the standard deviation of the generic Gaussian kernel. When the unilateral dimensions are limited, the ratio of the median value of the Gaussian kernel to the value which was calculated as an approximation and neglected is greater than 3 orders of magnitude, which is sufficient to preserve the filter accuracy.

Given that the initial standard deviation is σ0=1.4, the above choices result in the following scales σ={1.4; 2; 2.8; 4; 5.6} and, from these, the following filter dimensions are 9×9; 13×13; 17×17; 25×25; 35×35 for scales 1-5, respectively.

As will be shown below, a different choice is made for the practical implementation of the filters, in order to simplify the synchronization of all the scales.

Even if the separation of Gaussian filters reduces the amount of computations to one-dimensional filters, a large number of multiply-accumulator (MAC) operators are required to perform the convolution on filters having proper sizes. In an example, the DOG computing pipeline is constrained to floating-point arithmetic, 32-bit single precision IEEE-754 compliant (hereinafter, "FP32"). These FP32 units often require some additional logic to be used to synchronize the data path from/to the CPUs. The additional logic may be commonly implemented as tightly/loosely coupled coprocessors in System on Chips (SoCs). Therefore, the obtained performance is much less than what is achievable with integer-only arithmetic, in terms of both speed and code compactness. When designing custom hardware for DOG, an FP32 implementation causes the resulting designs to be huge in size and hardly finable in relatively constrained platforms. In this context, a fixed-point approach is helpful in reducing the required physical resources to obtain an effective system. With this purpose, tests have been conducted to prove the effective trade-off between the minimum number of bits required in Fixed-Point arithmetic to implement a 2D full Gaussian kernel and its 1+1D separable counterpart. Also, accounting for the 2D full (non-separated) kernel, limited differences are obtained by coding with 10 bits the intermediate, inter-Gaussian results and with 14 bits the 2D filtered pixels of the pyramid.

As shown in FIG. 1, a DOG filtering process may be applied to the smoothed images corresponding to the different scales to obtain a set of DOG images for each input image. For example, a set of four DOG images 14 and 16 from five smoothed images 10 and 12 corresponding to respective scales for each input image may be produced.

Figure 2:
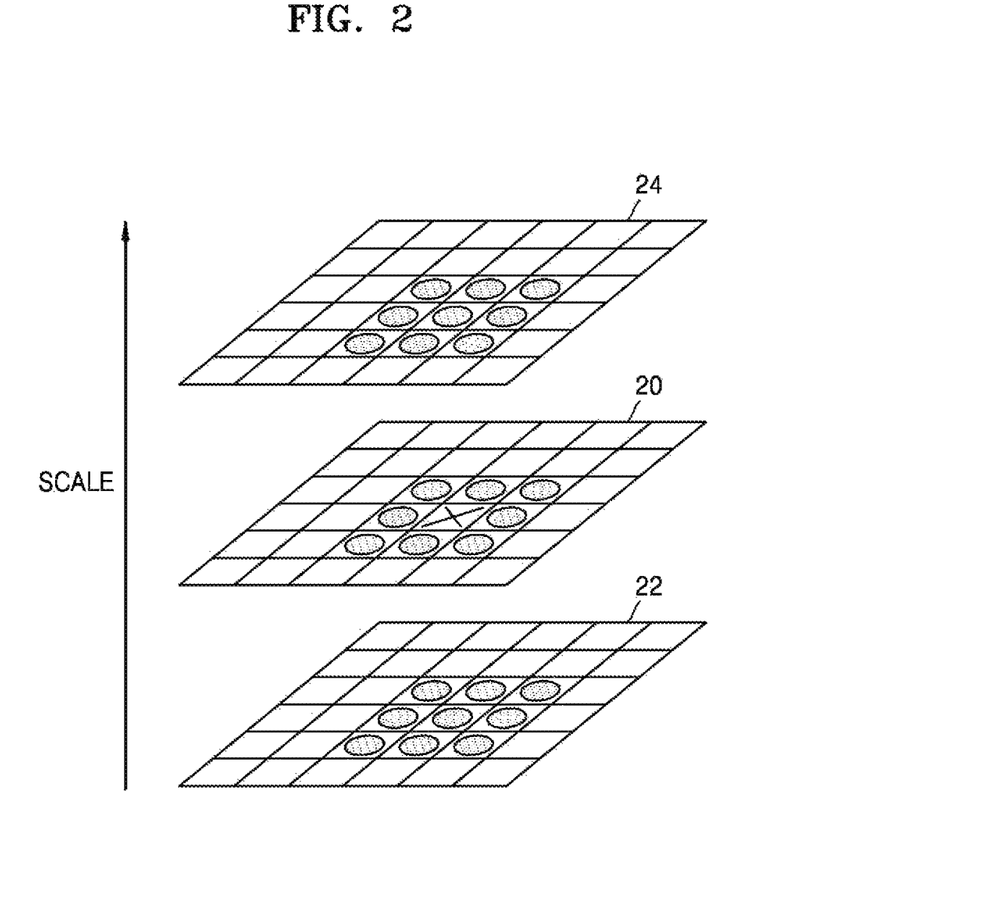
FIG. 2 is a diagram illustrating an example of a method of determining extrema.

Referring to FIG. 2, each pixel in the DOG image Di(x, y, σ) 20 may be set as a pixel (marked with x) marked adjacent to twenty-six compared pixels. The compared pixels include eight pixels in a 3×3 pixel region of the DOG image Di(x, y, σ) 20, and nine pixels each in a 3×3 pixel region of the DOG image Di+1(x, y, σ) 24 and Di−1(x, y, σ) 22. Thereafter, it may be determined whether data of the marked pixel is data of extreme points (i.e., a maximum or minimum value) among data of the marked and the compared pixels. When it is determined that the marked pixel is an extreme point, the marked pixel may be set as a candidate for an object key point. When the key point candidate is confirmed as the object key point, the scale value σ-i of the DOG image Di having the object key point may be used to calculate an image feature of the object key point.

When the DOG pyramid is generated, the key points may be identified by comparing each pixel in the DOG image with its eight neighbor pixels in the same scale 20 and nine pixels in two adjacent scales 22 and 24. When the pixel is an extremum (i.e., a maximum or a minimum), the pixel may be considered as a key point which will be continually valid. Since from the five scales, four DOGs can be calculated for each octave, the extrema detection may be performed by two pipes in parallel for each octave, by comparing the first and the second groups of three DOGs, respectively.

As used herein, the detection of extrema may include detecting extrema, or detecting, generating or receiving data indicating extrema.

In an example, a method of detecting extrema in a tile-based GPU is provided. The method includes receiving a candidate DOG layer of an image. In an example, the candidate DOG layer is computed based on tiles of the image. The candidate DOG layer is detected as an intermediate layer of the image. An extreme point is detected by comparing values of the candidate DOG layer with values from a previous DOG layer and a next DOG layer. The extreme point includes a maximum value or a minimum value. In an example, the detected data of extreme points is stored. In an example, the data of extreme points is sent to a shader core unit, in order to perform key point localization.

According to an embodiment, data of extreme points of the candidate DOG layer and the previous DOG layer is detected by comparing values of the candidate DOG layer with values of the previous DOG layer. In an example, the data of extreme points of the candidate DOG layer, the previous DOG layer, and next DOG layer is detected by comparing the data of extreme points of the candidate DOG layer and the previous DOG layer with values of the next DOG layer.

According to an embodiment, the values of the previous DOG layer is stored in a tile buffer.

An energy-efficient method of detecting extrema in the tile-based GPU is provided, where the extrema may be in energy sensitive mobile GPUs. In an example, Z comparison circuit available in the mobile GPUs is used to perform extrema detection.

In an example, the graphics processing method is executed via three different passes, which can be pipelined on programmable GPUs and non-programmable hardware. According to an embodiment, the GPU's graphics fixed function hardware is used for executing the provided methods. Also, for executing the provided methods, some additional components may be required, such as a buffer (referred to as an extrema buffer) that stores layer ID corresponding to an extreme point, or a state machine for determining a final list of extreme points. According to an embodiment, on chip frame buffer memory may be used for saving intermediate data, thereby providing more memory for saving the intermediate data. The use of the on chip frame buffer memory may free up shared memory for other passes. Via the methods provided in the present disclosure, GPU hardware may be effectively used so that execution speed becomes faster and energy is saved.

Figure 3:
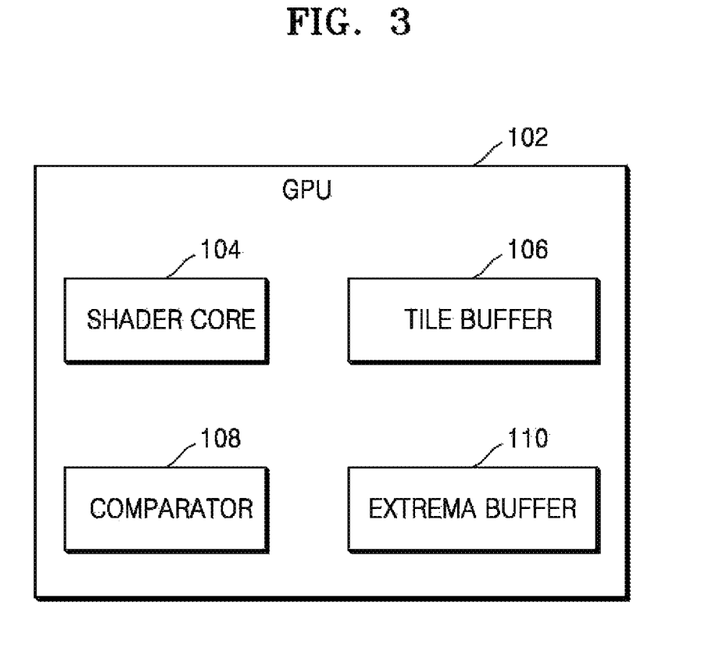
FIG. 3 is a diagram illustrating an example of an apparatus for detecting extrema that includes a graphics processing unit (GPU).

FIG. 3 is a diagram illustrating an example of an apparatus for detecting extrema, the apparatus including a GPU 102. As illustrated in FIG. 3, the apparatus includes the GPU 102. According to an embodiment, the GPU 102 includes a shader core 104, a tile buffer 106, a comparator 108 and an extrema buffer 110. In an example, the tile buffer 106 and the extrema buffer 110 may denote the same buffer.

In an example, the shader core 104 computes a candidate DOG layer. According to an embodiment, the candidate DOG layer is computed based on tiles of an image.

In an example, the shader core 104 receives a list of extreme points. The shader core 104 may use the received list of extreme points to localize key points and generate descriptors of the key points.

The tile buffer 106 may store values of a DOG layer. For example, when a candidate DOG layer is a "layer A", values of a "layer A−1", which is a previous DOG layer, may be stored in the tile buffer 106. In an example, the tile buffer 106 includes one or more computer-readable recording media. In an example, the tile buffer 106 includes non-volatile storage elements, such as, for example, magnetic hard discs, optical discs, floppy discs, flash memories, or electrically programmable memories (EPROM) or electrically erasable and programmable memories (EEPROM). In addition, the tile buffer 106 may be a non-transitory storage medium as described below. In some embodiments, the tile buffer 106 store more amounts of information than the memory. In some embodiments, a non-transitory storage medium (for example, random access memory (RAM) or cache) may store data that changes over time.

According to an embodiment, the comparator 108 is a Z comparison circuit existing in the mobile GPUs. In an example, the Z comparison circuit in the GPU 102 is used for extrema detection. According to an embodiment, the comparator 108 may receive the candidate DOG layer of the image. The comparator 108 may detect the candidate DOG layer as an intermediate layer.

In an example, the comparator 108 detects data of extreme points by comparing values of the candidate DOG layer with values of the previous DOG layer and the next DOG layer. For example, when the candidate DOG layer is a "layer A", the previous DOG layer is a "layer A−1", and the next DOG layer is a "layer A+1", the comparator 108 may compare pixel values of the "layer A" with pixel values of the "layer A−1" and the "layer A+1".

According to an embodiment, the comparator 108 may detect data of extreme points of the candidate DOG layer and the previous DOG layer by comparing the values of the candidate DOG layer with corresponding values of the previous DOG layer. That is, in order to detect the data of extreme points of the candidate DOG layer and the previous DOG layer, the comparator 108 may compare the pixel values of the "layer A" with corresponding pixel values of the "layer A−1".

Further, the comparator 108 may detect data of extreme points of the candidate DOG layer, the previous DOG layer, and next DOG layer by comparing the data of extreme points of the candidate DOG layer and the previous DOG layer with values of the next DOG layer. In an example, to detect the data of extreme points of the candidate DOG layer, the previous DOG layer, and the next DOG layer, the comparator 108 may compare the data of extreme points detected by comparing the pixel values of the "layer A" and the pixel values of the "layer A−1" with the pixel values of the "layer A+1".

In an example, the extrema buffer 110 stores the detected data of extreme points. The extrema buffer 110 store ID of a DOG layer corresponding to the detected extrema. The extrema buffer 110 may include one or more computer-readable recording media. The extrema buffer 110 may include non-volatile storage elements. Examples of such non-volatile storage elements may include magnetic hard discs, optical discs, floppy discs, flash memories, or EPROM or EEPROM. In addition, the extrema buffer 110 may be a non-transitory storage medium as described below. In some embodiments, the extrema buffer 110 may store more amounts of information than the memory. In some embodiments, a non-transitory storage medium (for example, random access memory (RAM) or cache) may store data that changes over time.

Figure 4:
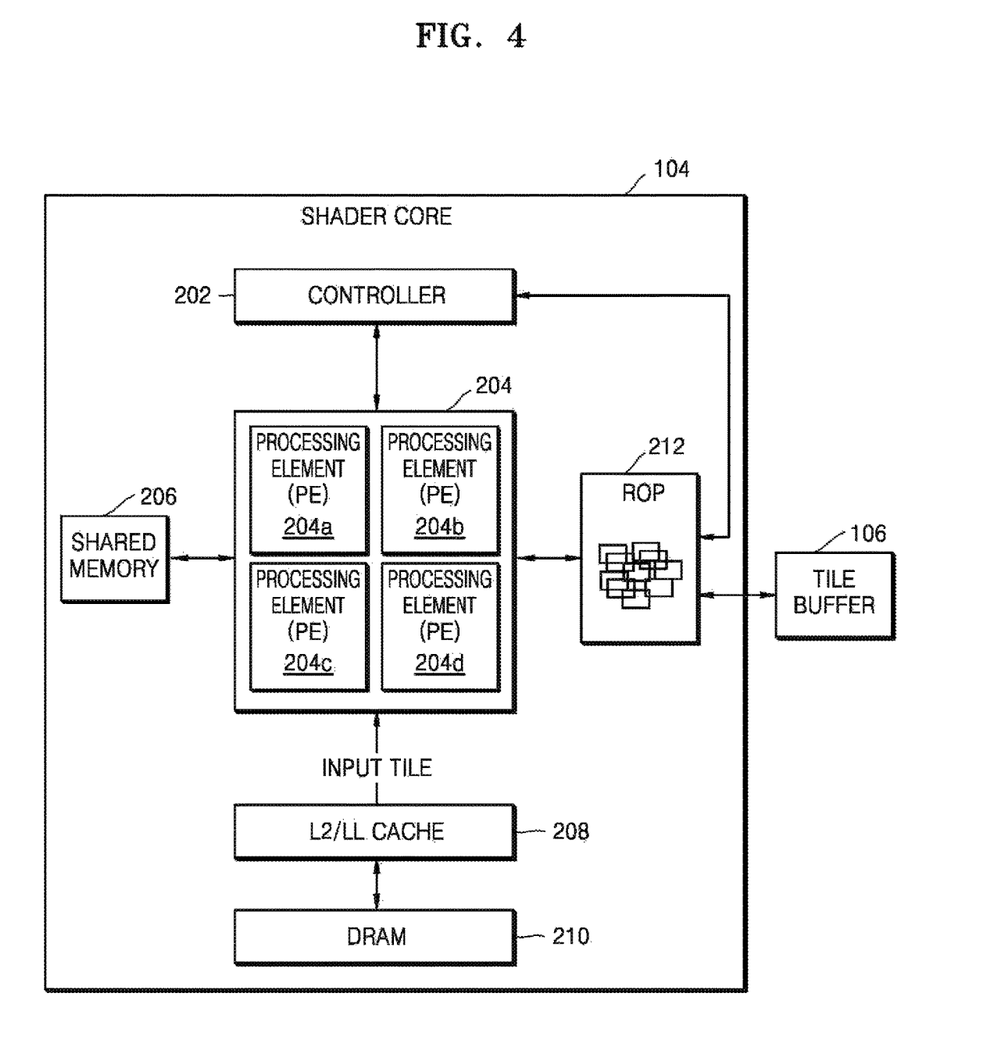
FIG. 4 is a diagram illustrating an example of a process of computing a difference of Gaussian (DOG) layer of an image.

FIG. 4 is a diagram illustrating an example of a process of computing a DOG layer of an image. A first pass for the computation of the DOG layer of the image is shown in FIG. 4. The first pass is executed in the shader core 104. In an example, the first pass includes a controller 202, a plurality of processing elements (PEs) 204a-204d, a shared memory 206, an L2/LL cache 208, DRAM 210, and a raster operations pipeline (ROP) 212. The input to the first pass is a tile of the image from which the Gaussian pyramid and the DOG pyramid are built. As illustrated in FIG. 4, the input tile is obtained by the L2/LL cache 208 from the DRAM 210, and the input tile is sent to the plurality of PEs 204a to 204d. The shared memory 206 is a memory system shared by the plurality of PEs 204a to 204d. The plurality of PEs 204a to 204d compute the DOG pyramid. The ROP 212 receives pixel data. For each octave, each DOG layer is sent to the ROP 212 one-by-one for extrema detection. In an example, the ROP 212 may merge data per pixel using configurable functions of the ROP 212. The output from the first pass is a subset of the DOG layer built from the input tile. According to an embodiment, values of the built DOG layer is stored in the tile buffer 106. According to an embodiment, the candidate DOG layer, the previous DOG layer and the next DOG layer may be obtained as the output from the first pass.

Figure 5:
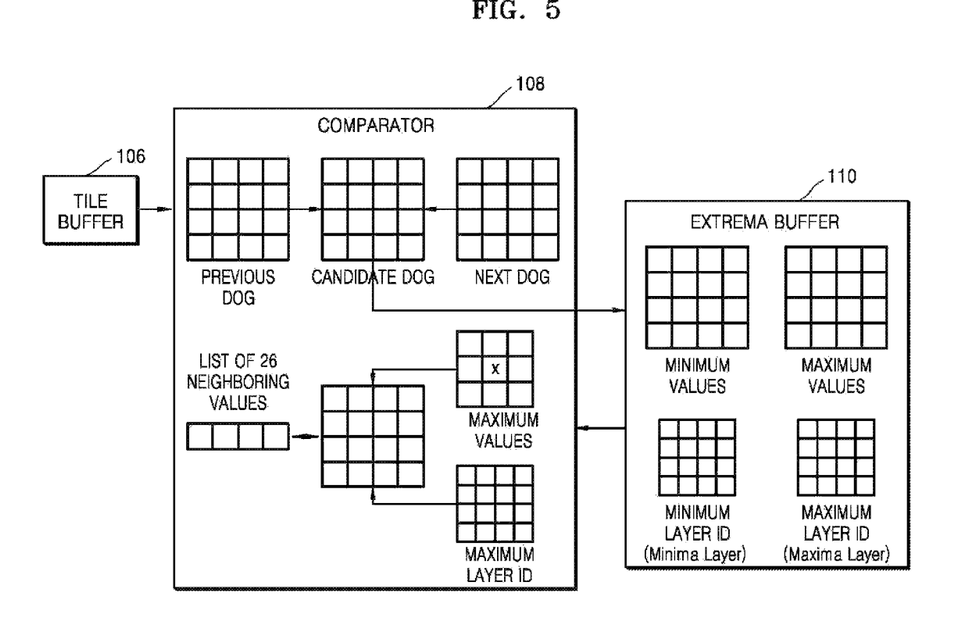
FIG. 5 is a diagram illustrating an example of a process of detecting data of extreme points.

FIG. 5 is a diagram illustrating an example of a method of detecting data of extreme points, according to an embodiment. A second pass for extrema detection is illustrated in FIG. 5. The second pass is executed in the comparator 108. The input to the second pass is a subset of the DOG layer received one-by-one from the plurality of PEs 204a to 204d in the shader core 104.

As illustrated in FIG. 5, the comparator 108 receives the DOG layer of the image from the shader core 104. The comparator 108 may detect the candidate DOG layer as the intermediate layer. The comparator 108 may obtain values from the DOG layer, which are stored in the tile buffer 106.

The comparator 108 may compare values from the candidate DOG layer with values from the previous DOG layer and the next DOG layer. For example, when the candidate DOG layer is a "layer A" and, when the "layer A" is received, the comparator 108 receives values of a "layer A−1" (the previous layer based on the candidate layer) from the tile buffer 106. The comparator 108 may compare values from the "layer A" with the corresponding values from the "layer A−1". After the comparison of the values, the minimum and/or maximum value in the extrema buffer 110, and the ID of the minimum layer and/or the maximum layer may be updated. According to an embodiment, when the values from the candidate DOG layer are greater than the values from the previous and next DOG layers, the maximum value in the extrema buffer 110 is updated as the values from the candidate DOG layer and the ID of the maximum layer may be the "layer A".

In the above example, when the "layer A" is the last layer, the comparator 108 detects final extrema and layer IDs corresponding to the extrema, respectively, from the extrema buffer 110. The comparator 108 compares the extrema with 26 neighboring values based on the layer ID corresponding to the detected extrema, and generates a list of the extrema greater (maximum) or smaller (minimum) than the neighboring values and transmits the generated list to the shader core 104. In an example, FIG. 5 illustrates that the list of 26 neighboring extreme points includes maximum values. In another example, the list of 26 neighboring extreme points may include minimum values.

Figure 6:
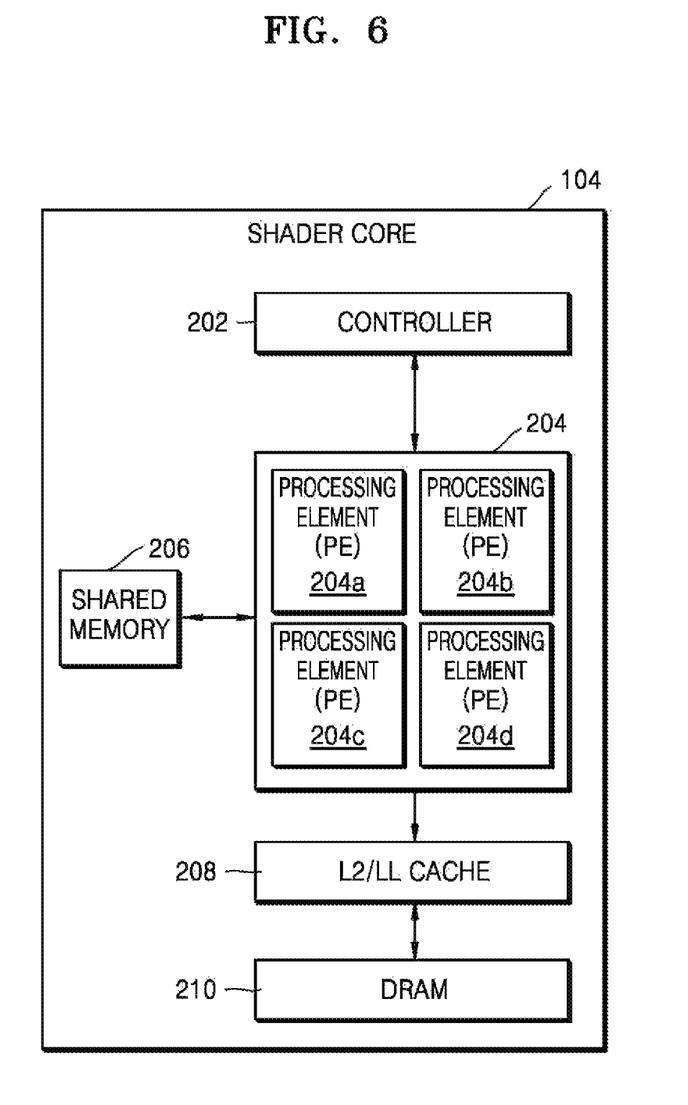
FIG. 6 is a diagram illustrating an example of a process of localizing a point of interest.

FIG. 6 is diagram illustrating an example of a process of localizing a key point. FIG. 6 illustrates a third pass for key point localization. The third pass is executed in the shader core 104. In an example, the third pass includes the controller 202, the PEs 204a to 204d, the shared memory 206, the L2/LL cache 208, and DRAM 210. The input to the third pass is the list of extreme points (maximum values and/or minimum values) detected in the second pass and the output is a list of key point descriptors generated by the PEs 204*a* to 204*d*. In the third pass, the controller 202 sends selected data of extreme points to the PEs 204*a* to 204*d* for localizing key points and generating the descriptors for the key points.

Figure 7:
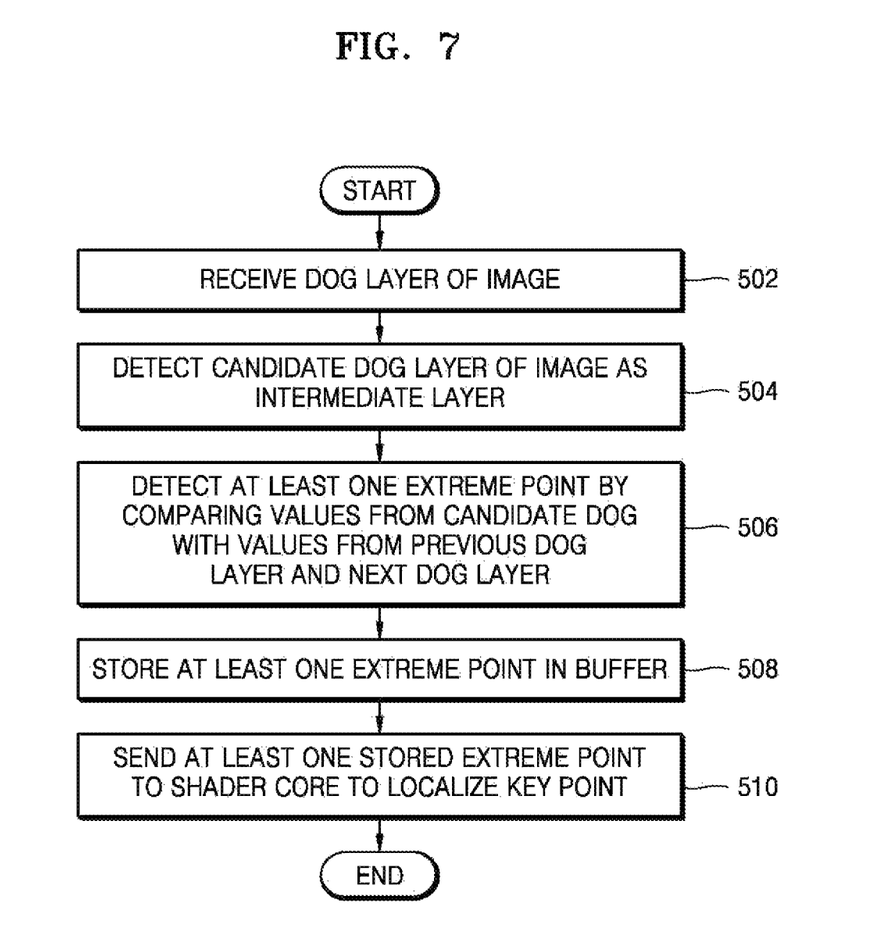
FIG. 7 is a diagram illustrating an example of a method of detecting data of extreme points in a GPU.

FIG. 7 is a diagram illustrating an example of a method of detecting data of extreme points in the GPU 102. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. In addition to the description of FIG. 7 below, the above descriptions of FIGS. 1-6, are also applicable to FIG. 7, and are incorporated herein by reference. Thus, the above description may not be repeated here. In S502, the comparator 108 receives at least one DOG layer from the PEs 204*a* to 204*d* in the shader core 104. In S504, the comparator 108 detects the candidate DOG layer as the intermediate DOG layer of the image.

In S506, the comparator 108 may detect the data of extreme points by comparing values from the candidate DOG layer with values from the previous DOG layer and the next DOG layer.

In S508, the extrema buffer 110 may store the detected data of extreme points. In S510, the comparator 108 may send the data of extreme points to the shader core 104 to localize the key points, and the shader core 104 may perform key point localization by using the data of extreme points.

Figure 8:
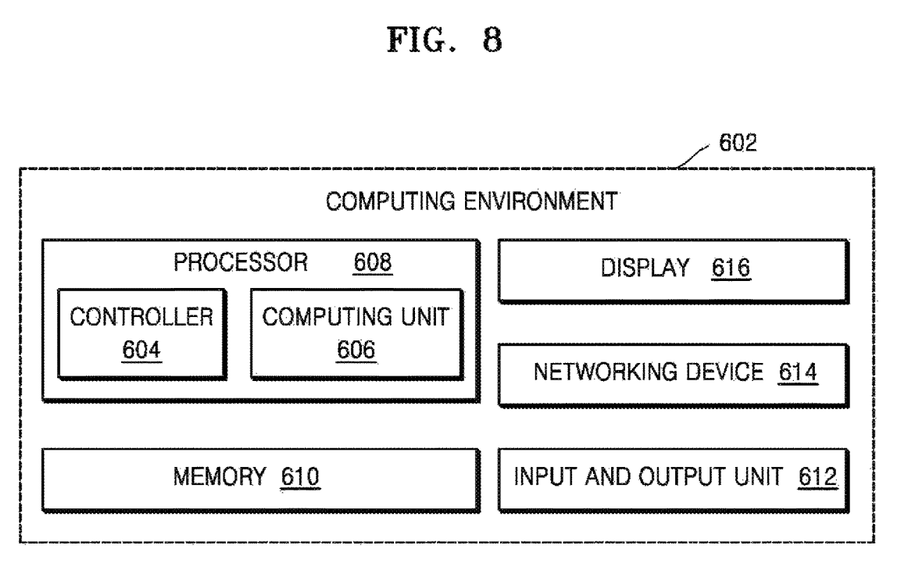
FIG. 8 is a diagram illustrating an example of a computation environment for executing a method of detecting data of extreme points in a GPU.

FIG. 8 is a diagram illustrating an example of a computing environment 602 in which the GPU executes the method of detecting the data of extreme points. As illustrated in FIG. 8, the computing environment 602 includes at least one processor 608 including a controller 604 and a computing unit 606, a memory (or a storage) 610, an input and output unit 612, a plurality of networking devices 614, and a display 616. The processor 608 may execute instructions of the algorithm. The processor 608 may receive commands from the controller 604. Further, the processor 608 may perform logical and arithmetic operations involved in the execution of the instructions with the help of the computing unit 606.

The overall computing environment 602 may include multiple homogeneous and/or heterogeneous cores, multiple CPUs of different kinds, special media and other accelerators. The processor 608 may process the instructions of the algorithm. Further, the plurality of processors 608 may be located on a single chip or multiple chips.

The algorithm including instructions and codes required for the execution may be stored in the memory 610. At the time of execution, the instructions may be fetched from the corresponding memory 610 and executed by the processor 608.

In case of any hardware implementations, the input and output unit 612 and various networking devices 614 may be connected to the computing environment 602. The image may be displayed on the display 616.

In an example, the display 616 may be a physical structure that includes one or more hardware components that provide the ability to render a user interface and/or receive user input. The display 616 can encompass any combination of display region, gesture capture region, a touch sensitive display, and/or a configurable area. In an example, the display 616 is an external peripheral device that may be attached to and detached from the computing environment 602. The display 616 may be a single-screen or a multi-screen display. A single physical screen can include multiple displays that are managed as separate logical displays permitting different content to be displayed on separate displays although part of the same physical screen. The display 616 may also be implemented as an eye glass display (EGD), which includes one-eyed glass or two-eyed glasses.

In an example, the device for processing data of extreme points may be embedded in or interoperate with various digital devices such as, for example, a mobile phone, a cellular phone, a smart phone, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be embedded in or interoperate with a smart appliance, an intelligent vehicle, an electric vehicle, a hybrid vehicle, a smart home environment, or a smart building environment.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a necklace, an earring, a headband, a helmet, a device embedded in the cloths, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

In an example, provided is a method of detecting extrema in a tile-based graphics processing unit (GPU). In another example, provided is a method of receiving a candidate difference of Gaussian (DOG) layer of an image. The candidate DOG layer is computed based on tiles of the image. In another example, provided is a method of detecting the candidate DOG layer as an intermediate layer of the image. In another example, provided is a method of detecting data of extreme points by comparing values of the candidate DOG layer with values of a previous DOG layer and a next DOG layer. In another example, provided is a method of storing the detected data of extreme points in an extrema buffer.

The apparatuses, units, modules, devices, and other components illustrated that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), electrically erasable programmable read-only memory (EEPROM), random-access memory (RAM), dynamic random access memory (DRAM), static random access memory (SDRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing graphics data by executing multiple pipeline passes of a processor to detect a feature of an image, the method comprising:

receiving, at a processor, a difference of Gaussian (DOG) layer of the image, the DOG layer generated by pixel subtraction of adjacent scale space layers of the image from each other;

detecting, from the received DOG layer, a candidate DOG layer of the image as an intermediate layer;

detecting at least one extreme point of the image by comparing corresponding pixel values of the candidate DOG layer with pixel values of a previous DOG layer and a next DOG layer; and storing the at least one extreme point of the feature of the image in a buffer; and wherein the multiple pipeline passes of the processor include a first pass for generating the DOG layer of the image, a second pipeline pass for extrema detection, and a third pipeline pass for performing key point localization.

2. The method of claim 1, wherein key point localization is performed at a shader core of the processor using the stored at least one extreme point detected during the second pipeline pass.

3. The method of claim 1, wherein the detecting of the at least one extreme point comprises:

comparing the pixel values of the candidate DOG layer with the corresponding pixel values of the previous DOG layer to detect extreme points; and comparing the extreme points of the candidate DOG layer and the previous DOG layer with the corresponding pixel values of the next DOG layer to detect the at least one extreme point.

4. The method of claim 1, wherein values of the DOG layer are stored in the buffer.

5. The method of claim 1, wherein the DOG layer is computed via a shader core of the processor based on tiles of the image comprised of pixels.

6. The method of claim 1, wherein the at least one extreme point comprises any one or any combination of a maximum value and a minimum value.

7. A non-transitory computer-readable recording medium storing instructions that, when executed by a processor, cause the processor to perform the method of claim 1.

8. A device for processing data of extreme points, the device comprising:

a graphics processing unit (GPU) configured to:
  receive a candidate difference of Gaussian (DOG) layer of an image, the DOG layer generated by pixel subtraction of adjacent scale space layers of the image from each other,
  detect the candidate DOG layer of the image as an intermediate layer, and
  detect at least one extreme point by comparing corresponding pixel values of the candidate DOG layer with values of a previous DOG layer and a next DOG layer; and a buffer configured to store the at least one extreme point, wherein the GPU is configured to perform multiple pipeline passes to detect the at least one extreme point.

9. The device of claim 8, further comprising:
a shader core configured to receive the stored at least one extreme point, and to detect key point localization of the received at least one extreme point.

10. The device of claim 8, wherein the GPU is further configured to:
compare the values of the candidate DOG layer with the corresponding pixel values of the previous DOG layer to detect extreme points, and
compare the extreme points of the candidate DOG layer and the previous DOG layer with the corresponding values of the next DOG layer to detect the at least one extreme point.

11. The device of claim 8, wherein values of the DOG layer are stored in the buffer.

12. The device of claim 11, further comprising a shader core configured to compute the DOG layer based on tiles of the image comprised of pixels.

13. The device of claim 8, wherein the at least one extreme point comprises any one or any combination of a maximum value and a minimum value.

14. A graphics processing unit (GPU) to detect at least one extreme point in an image, the GPU comprising:

a shader core configured to determine a difference of Gaussian (DOG) layer of an image, the DOG layer generated by pixel subtraction of adjacent scale space layers of the image from each other;

a comparator configured to identify the DOG layer as an intermediate layer, and to detect the at least one extreme point by comparing corresponding pixel values of the DOG layer with values of a previous DOG layer and a next DOG layer; and a buffer configured to store values of the DOG layer, the previous layer, the next layer and the extreme point, wherein the GPU is configured to perform multiple pipeline passes to detect the at least one extreme point.

15. The GPU of claim 14, wherein the comparator is further configured to:
obtain pixel values of the DOG layer from the buffer;
compare the pixel values of the DOG layer with the values of the previous layer, stored in the buffer, to detect first extreme points;
compare the first extreme points with the values of the next layer, stored in the buffer, to detect the at least one extreme point.

16. The GPU of claim 14, wherein the shader core is further configured to receive the detected at least one extreme point, during one of the multiple passes of the pipeline to perform key point localization on the received at least one extreme point.

* * * * *